United States Patent [19]

Gibson et al.

[11] Patent Number: 4,699,354

[45] Date of Patent: Oct. 13, 1987

[54] RETROFIT DEVICE FOR ALFALFA VALVES

[75] Inventors: Clayton H. Gibson, Grand Junction, Colo.; David A. Young, Mililani Town, Hi.

[73] Assignee: The United States of America as represented by the Secretary of Agriculture, Washington, D.C.

[21] Appl. No.: 892,006

[22] Filed: Aug. 1, 1986

[51] Int. Cl.[4] .......................................... F16K 31/145
[52] U.S. Cl. .................................. 251/61.5; 137/269; 251/147; 251/367
[58] Field of Search ................... 251/61.5, 61.2, 61.3, 251/61.4, 367, 147, 152; 137/269

[56] References Cited

U.S. PATENT DOCUMENTS

| | | | |
|---|---|---|---|
| 583,302 | 5/1897 | Ewart | 251/147 |
| 2,230,914 | 2/1941 | Sherman | 50/16 |
| 2,301,978 | 11/1942 | Signalness | 137/111 |
| 2,437,552 | 3/1948 | Quiroz | 137/153 |
| 2,616,451 | 11/1952 | Hunter | 137/688 |
| 2,617,446 | 11/1952 | Williamson | 251/147 |
| 2,693,932 | 11/1954 | Richards | 251/61 |
| 2,698,729 | 1/1955 | Cox et al. | 251/25 |
| 2,783,021 | 2/1957 | Bickley | 251/367 X |
| 2,863,631 | 12/1958 | Boteler | 251/367 X |
| 2,873,754 | 2/1959 | Dunaway | 137/81 |
| 3,085,780 | 4/1963 | Yale | 251/61 |
| 3,320,750 | 5/1967 | Haise et al. | 61/12 |
| 3,689,025 | 9/1972 | Kiser | 251/25 |
| 3,743,237 | 7/1973 | Kiser | 251/25 |
| 3,960,358 | 6/1976 | Vollmer | 251/61.5 |
| 4,163,543 | 8/1979 | Cook | 251/48 |
| 4,198,030 | 4/1980 | Jackson et al. | 251/61.5 |
| 4,235,413 | 11/1980 | Baker | 251/11 |
| 4,239,181 | 12/1980 | Brakebill | 251/61.5 |
| 4,363,463 | 12/1982 | Moon, Jr. | 251/61 |
| 4,489,756 | 12/1984 | Balz | 137/625.33 |

FOREIGN PATENT DOCUMENTS

| 551874 | 3/1943 | United Kingdom | 251/367 |
| 1231579 | 5/1971 | United Kingdom | 137/269 |

Primary Examiner—Alan Cohan
Assistant Examiner—Stephen M. Hepperle
Attorney, Agent, or Firm—M. Howard Silverstein; David G. McConnell; Margaret A. Connor

[57] ABSTRACT

A device is described to retrofit an alfalfa valve, without modification of the valve, to convert it from manual to pneumatic control and provide means for closure of the valve if operating pressure to the system is interrupted. The device comprises a first vertical shaft with a short upper threaded portion to secure the shaft to the cover of the alfalfa valve and a lower unthreaded portion; a second vertical shaft above the first shaft and coupled thereto; a chamber including pneumatic means for raising and lowering the shafts, wherein the shafts are in the raised position when the chamber is under pneumatic pressure; a horizontal plate connected to the bottom of the chamber and having a central hole to permit the second shaft to pass therethrough; leg means to stand the plate on top of a flange upon which the cover of the alfalfa valve sits, and means to clamp the plate to the flange.

3 Claims, 4 Drawing Figures

1

RETROFIT DEVICE FOR ALFALFA VALVES

BACKGROUND OF THE INVENTION

1. Field of the Invention

This invention relates to a device to retrofit a valve such as an alfalfa valve, without modification of the valve, to convert it from manual to pneumatic control and provide means for closure of the valve if operating pressure to the system is interrupted.

2. Description of the Art

In irrigation systems, the flow of water to furrows, fields, or other selected areas is controlled by valves which release water automatically or by manual control from irrigation pipelines. Most devices applicable to irrigation systems which used buried irrigation pipelines rely on inflatable bladders or diaphragms, in contact with the flowing irrigation stream, and actuated by hydraulic or pneumatic pressure. About 30 to 40% of all surface irrigated acreage in the United States involves the use of alfalfa valves. FIG. 4 shows a manually controlled alfalfa valve used to regulate water flow from a pipe (29) which contains irrigation water under low pressure. An alfalfa valve consists of a threaded stem (32) carrying a circular dish-shaped cover (25). Stem 32 is secured to cover 25 through threaded hole 36 in the center of cover 25 and is screwed into a threaded nut (28) supported by radial arms (27). Pipe 29 has a valve mount (flange 26) fastened at its top. The valve is designed so that when cover 25 is secured against flange 26, water is prevented from flowing out of the pipe. To operate, handle 33 on stem 32 is rotated so that cover 25 is pushed against flange 26 to prevent the flow of water out of pipe 29 or raised from flange 26 to allow water to flow out of the pipe.

Haise et al. (U.S. Pat. No. 3,320,750) describes a pneumatically operated irrigation system for use in conjunction with an alfalfa valve. In this system, an inflatable member is positioned between cover 25 and flange 26 such that when the member is inflated, water is prevented from flowing out of the pipe 25, and when the inflatable member is deflated, water is allowed to flow out of the pipe and irrigate the field being served. This system can be controlled automatically by use of timers or electrical circuits which cause the valve to be opened or closed.

A serious problem with devices which use inflatable bladders or diaphragms to control irrigation equipment is that the devices have the characteristic of opening if the source of the operating pressure is interrupted, either intentionally as part of the irrigation operation or unintentionally by malfunction of the system. As a result, malfunctions can cause expensive and sometimes disastrous inundations of water onto the field.

While pneumatic valves which operate so that interruption of operating pressure closes the valve, no device is available to readily convert an alfalfa valve to a pneumatic valve and provide a means for closure of the valve if the control pressure to the system is interrupted.

SUMMARY OF THE INVENTION

The invention provides means to retrofit an alfalfa valve, without modification of the valve, to convert it from manual to pneumatic control. Alfalfa valves fitted with the invention have the characteristic of closing if the operating pressure is interrupted, thereby preventing costly damage to crops which results from accidental inundations of the crop field.

The retrofit device of the invention provides means for lifting the horizontal cover of an alfalfa valve off the top of a vertical irrigation pipe. As described above, the irrigation pipe has a flange at its top on which the cover sits, the flange extends horizontally beyond the perimeter of the cover, the cover includes a threaded hole in the center, the irrigation pipe includes a threaded nut in the center of the pipe inside the pipe below the cover, and the nut is connected to a plurality of radial arms which in turn are connected to the interior of the pipe.

The retrofit device comprises:

(a) a first vertical shaft having a short threaded portion in the upper part thereof to secure the shaft to the cover of the alfalfa valve through the threaded hole, wherein the shaft's lower part is unthreaded and is narrow enough to slidably pass through the nut in the pipe;

(b) a second vertical shaft above the first shaft;

(c) removable coupling means at the top of the first shaft to couple the first shaft to the second vertical shaft;

(d) a chamber at the top of the second shaft, the chamber having an opening in the bottom thereof to permit the top of the second shaft to pass therethrough, the chamber including pneumatic means therein connected to the top of the second shaft to raise and lower the second shaft, and thereby to raise and lower the first shaft through the coupling means, wherein the shafts are in the raised position when the chamber is under pneumatic pressure;

(e) a horizontal plate connected to the bottom of the chamber, the plate having a hole through the center thereof to permit the second shaft to pass therethrough;

(f) vertical leg means extending from the bottom of the plate to stand the plate on the top of the horizontal flange beyond the perimeter of the cover; and (g) means to clamp the plate to the horizontal flange.

In accordance with this discovery, it is an objective of the invention to provide a retrofit device to convert an alfalfa valve to pneumatic control without modification of the valve and to provide a means for closure of the valve if operating pressure to the system is interrupted.

It is also an object of the invention to provide means for automating irrigation systems which use alfalfa or like valves, and thereby increase irrigation efficiency and water conservation.

It is a further object of the invention to provide means to operate a screw-type valve with a linear drive.

Another important objective of the invention is the provision of a chamber housing the pneumatic means to thereby protect it from natural environmental degradation, such as solar radiation, dirt, and wind. By being elevated above an alfalfa valve the pneumatic means is further protected from exposure to irrigation water. These features increase the life-span of the pneumatic means, increase the dependability of the retrofit device and valve it operates, and reduce equipment failure.

Other objects and advantages of the invention will become readily apparent from the ensuing description.

DETAILED DESCRIPTION OF THE INVENTION

The device of the invention is next described with reference to the attached drawings. The term alfalfa valve is used by way of example and is not meant to be limiting. Other valves which may be retrofitted with the device of the invention include an orchard valve, pasture valve, over-arch valve, and the like.

Figure 1:
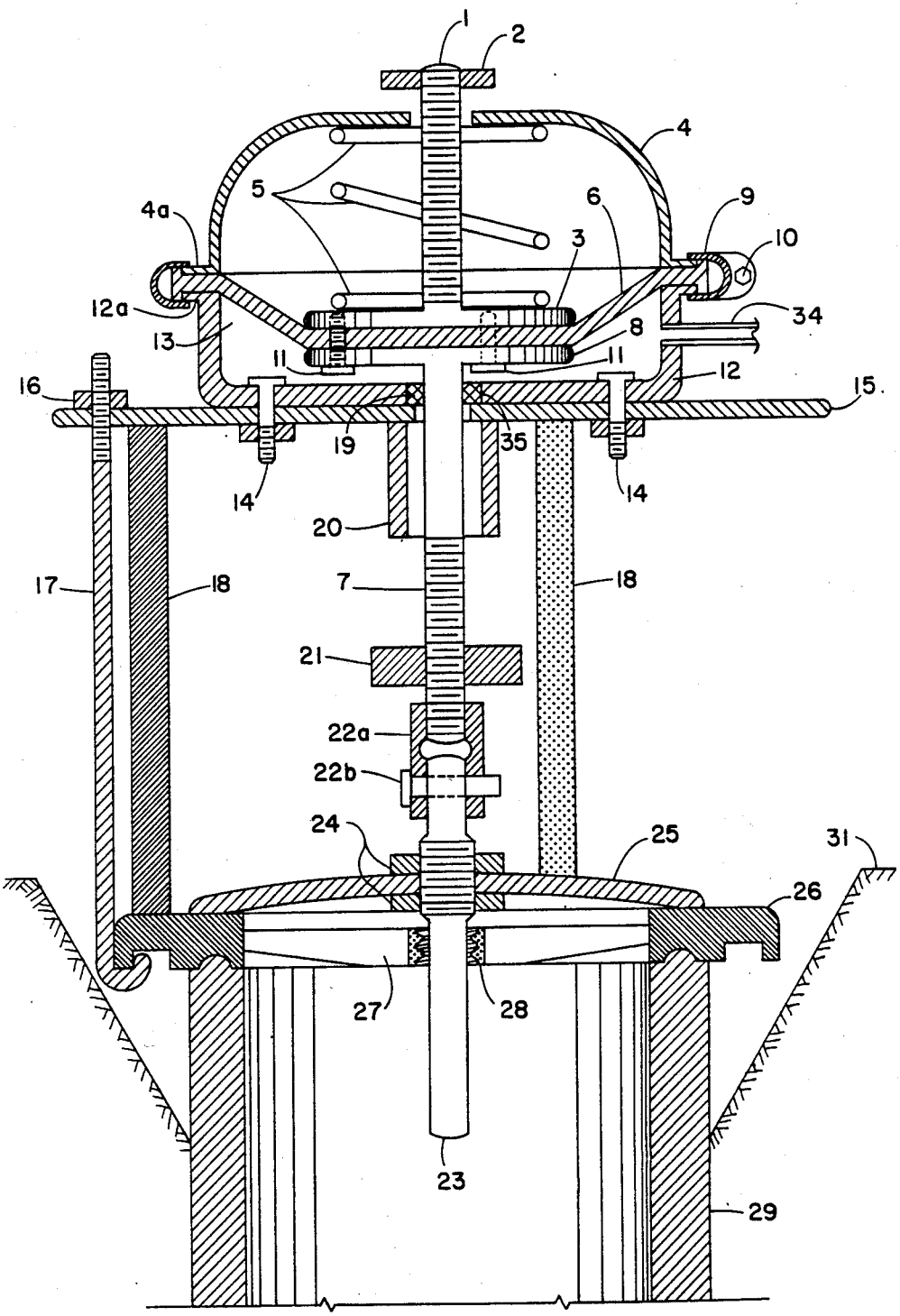
FIGS. 1 and 2 are sectional views taken from the front showing the the retrofit device of the invention attached to an alfalfa valve wherein the valve is in the closed position (FIG. 1) and open position (FIG. 2).
Figure 2:
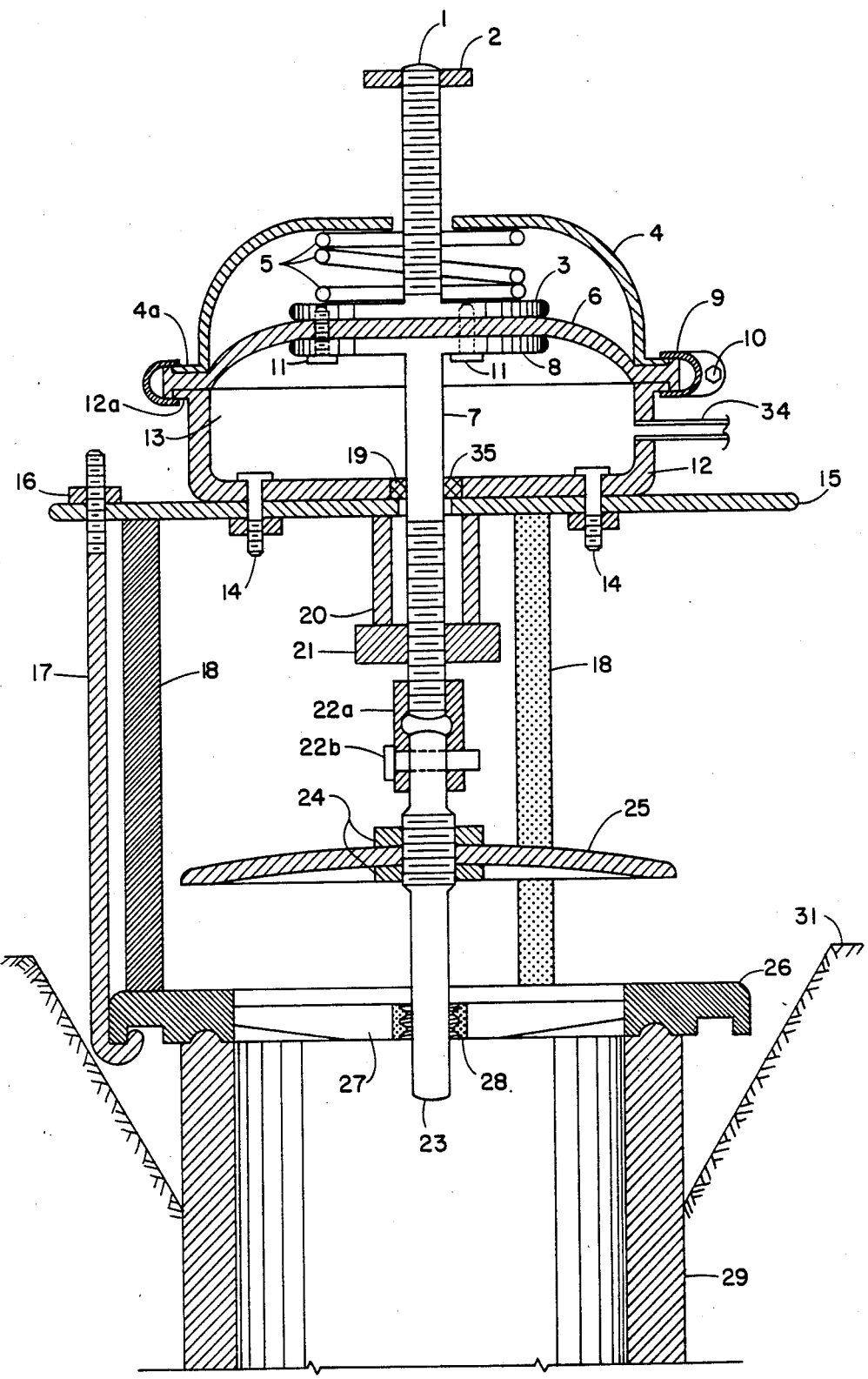
Figure 3:
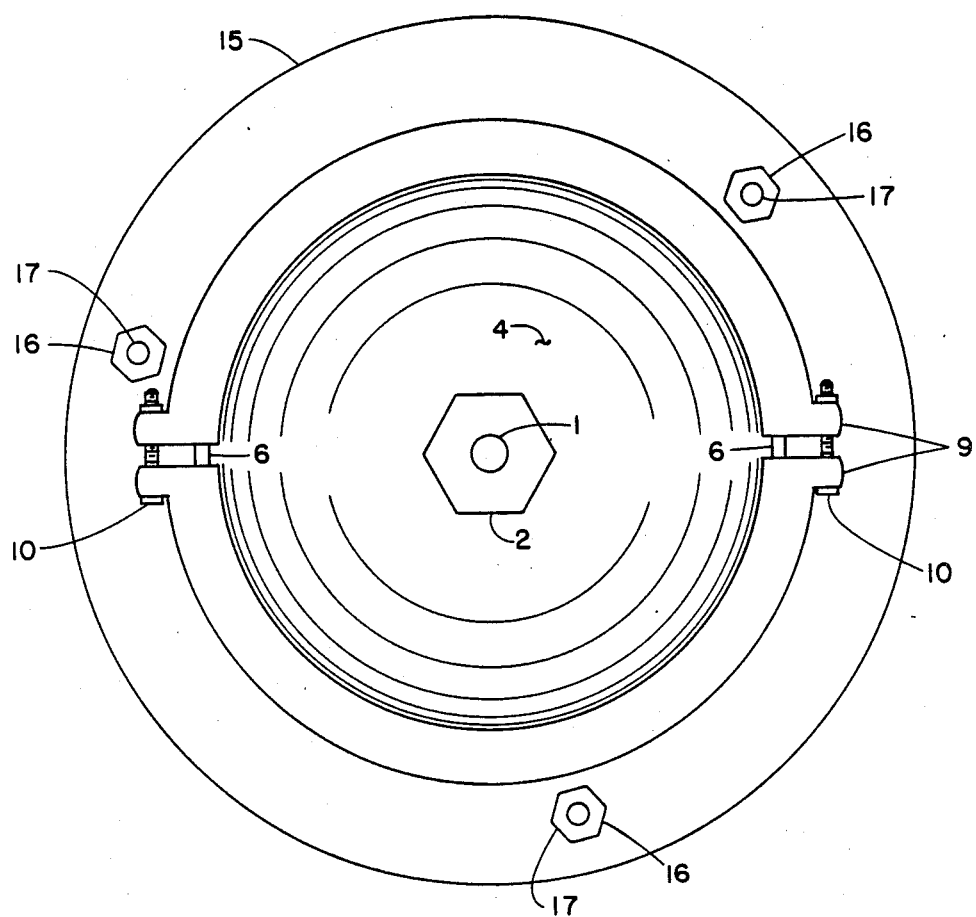
FIG. 3 is an enlarged top view of the retrofit device of the invention.
Figure 4:
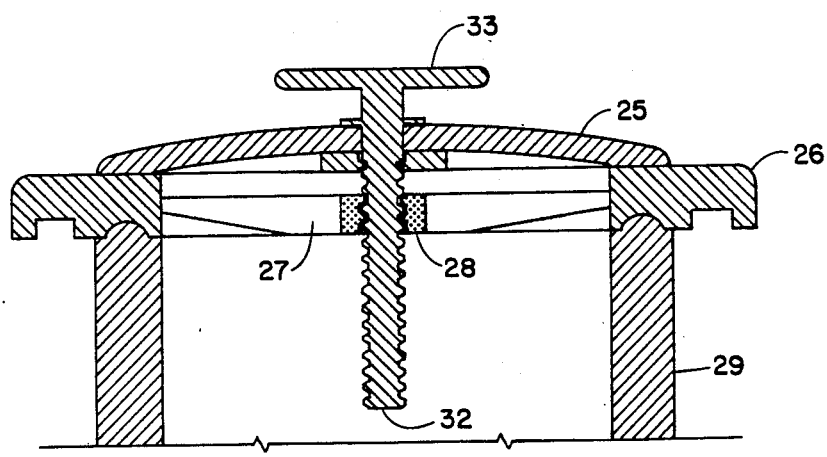
FIG. 4 is a front sectional view of a conventional alfalfa valve.

Referring to FIGS. 1–3, the device of the invention is composed generally of (a) a first vertical shaft (23) having a short threaded portion in the upper part of the shaft and having a lower unthreaded portion which is narrow enough to slidably pass through the threaded nut (28) of a conventional alfalfa valve; (b) a second vertical shaft (7) removably coupled to the first shaft; (c) a chamber (13) at the top of the second shaft which has an opening in the bottom to permit the top of the second shaft to pass through and has pneumatic means therein to raise and lower the second shaft and thereby raise and lower the first shaft, such that the second shaft is in the raised position when the chamber is under pneumatic pressure; (d) a horizontal plate (15) connected to the bottom of the chamber, the plate having a central opening to permit the second shaft to pass through; (e) vertical leg means (18) to stand the horizontal plate on top of the flange (26) on an alfalfa valve, and (f) means to clamp the flange to the horizontal plate.

By means of this invention, an alfalfa valve is actuated open by introducing air or other fluid pressure through tube 34 into chamber 13. This forces diaphragm 6 to compress spring 5 between cage plate 3 and cap 4. Cage plate 3 and drive plate 8 are fastened together by bolts 11, thus, shaft 7 which is rigidly attached to plate 8 is raised when spring 5 is compressed. Shaft 23 is connected to shaft 7 by means of coupling means 22. The raising of shaft 7 by compression of spring 5 causes shaft 23 to be raised which in turn causes cover 25 of the alfalfa valve to be raised and in the open position as shown in FIG. 2. Water flows out of pipe 29 and irrigates soil 31.

As shown in FIGS. 1 and 2, coupling means 22 consists of a clevis pin consisting of threaded clevis (22a) and pin (22b). Other coupling means known to those in the art can be used, for example, a universal joint, a threaded coupler, and the like.

The valve is actuated close by venting air in chamber 13 to the atmosphere via tube 34. This causes spring 5 to extend thereby lowering shaft 7 which in turn causes shaft 23 to be lowered so that cover 25 is forced against flange 26, preventing water from flowing out of pipe 29.

Shaft 23 is perpendicular to the plane of cover 26. It has a short threaded portion in the upper part of the shaft to secure the shaft to cover 25 by engagement with threaded nuts 24·which lock against cover 25. Shaft 23 has an unthreaded lower portion which is sufficiently narrow to slidably pass through threaded nut 28 of the alfalfa valve. Nut 28 serves as a bushing, supported in the center of pipe 29 by radial arms 27. Cover 25 is centered on pipe 29 be means of shaft 23.

Chamber 13 is bounded by diaphragm 6 and chamber wall 12. Mounting bolts 14 secure chamber wall 12 to horizontal plate 15. Bolts 14 are secured so that they seal the hole in chamber wall 12 where they pass through. Chamber 13 has a central opening 35 located in the bottom of the chamber which communicates with the central opening of horizontal plate 15 to permit the upper portion of shaft 7 to pass through. Bushing 19 located adjacent to the central hole in chamber 13 is of a size such that bushing 19 seals chamber 13 from the outside atmosphere while still allowing the raising and lowering of shaft 7 for operation of the invention. As shown in the drawings, the portion of shaft 7 which passes through bushing 19 is not threaded in order to maintain the seal of chamber 13 and the lower portion is threaded to provide engagement with threaded stop nut 21.

Diaphragm 6 in chamber 13 is circular and extends past flanges 4a of cap 4 and flanges 12a of chamber wall 12, respectively. Clamp 9 extends around the flanges and fastens cap 4 to chamber wall 12 with the edge of diaphragm 6 between the flanges. Bolts 10 secure the sides of clamps 9 together.

Stop block 20, which extends from horizontal plate 15 to the threaded portion of shaft 7, limits the distance that the alfalfa valve opens. The height which cover 25 is raised when the valve is in the open position can be controlled by adjustment of stop nut 21 threadably attached to the threaded portion of shaft 7. Stop nut 21 is screwed along shaft 7. The distance between stop nut 21 and stop block 20 when the valve is closed determines the distance lid 25 can be raised above flange 26. The maximum lift of cover 25 is determined by the distance that caging plate 3 moves from the closed position to full compression of spring 5 against cap 4.

The strength of spring 5 required to force the valve shut and retain it closed is dependent upon the water supply head pressure. A spring is chosen which will exert a force slightly greater than the force of the water head pressure against cover 25. Thus, the device is readily adaptable to different water head pressures while still maintaining a minimum required air pressure to open and close the valve. When shut off, the spring load eliminates the need to supply air pressure to the system.

The invention is readily attached to a conventional alfalfa valve without modification of the valve. This is accomplished by removing handle 33 with attached stem 32 from the valve. Leg supports 18 which extend from the bottom of horizontal plate 15 are used to stand plate 15 above flange 26 beyond the perimeter of cover 25. Clamp means secure flange 26 to horizontal plate 15. As shown in the drawings, the clamp means includes vertical connecting rods 17 which are adjustably and removably connected to the perimeter of plate 15 be means of retaining nuts 16. The lower end of rods 17 have hook means to hook the bottom of the rods underneath flange 26. The device is removed by loosening retaining nuts 16 until rods 17 and leg supports 18 no longer clamp plate 15 and flange 26 together. Rods 17 may be eliminated by bolting legs 18 directly to flange 26.

Diaphragm 6 is made of a material such as rubber or other elastomeric material. Use of diaphragm 6 results in a relatively inexpensive drive mechanism. A large surface-area diaphragm reduces air pressure required to operate the valve. This results in economic savings by reducing energy and maintenance costs to run an air compressor or other source of air pressure. Lower operating air pressures also result in increased safety of operation.

Automation of the invention may be accomplished by any means known to those in the art. For example a solenoid controlled, air pressure powered system may be used to regulate the opening and closing of the valve by controlling the air pressure to chamber 13. A timer or other conventional electrical control may be used to actuate the solenoid. When actuated, the solenoid connects a pressurized air supply to chamber 13 through tube 34 to force diaphragm 6 to compress spring 5 thereby raising shafts 7 and 23 and opening the valve. When not actuated, the solenoid connects air chamber 13 to the atmosphere and seals off the air supply line, thus the valve is maintained in the closed position. As discussed above, this system provides closure of the valve when the control pressure to the system is interrupted, for example, by electrical failure, compressor breakdown or air supply line breakdown. This feature prevents accidental and costly inundations of irrigation water onto the field being served.

Manual operation of the invention may be accomplished by a manual relay switch to control the solenoid. Caging nut 2 may also be used to manually operate the valve. Tightening of caging nut 2 compresses spring 5 between caging plate 3 and cap 4. This raises shaft 7 and opens the valve. Loosening caging nut 2 returns spring tension against drive shaft 7 and closes the valve. Caging shaft 1 may be made removable from cage plate 3 by a conventional twist coupling. This allows the placement of a filter in the oversized hole through which caging shaft 1 passes. In this manner dirt and water may be prevented from entering inside cap 4 and harming diaphragm 6. Access for the use of the caging shaft is still available by removal of the filter.

It is understood that the foregoing detailed description is given merely by way of illustration and that modification and variations may be made therein without departing from the spirit and scope of the invention.

Having thus described our invention, we claim:

1. In a cover-lifting means for lifting a horizontal cover off the top of a vertical irrigation pipe in a crop field, wherein water flows out of said irrigation pipe onto said field when said cover is lifted, wherein said pipe has a flange at its top on which said cover sits, wherein said flange encircles said top, wherein said flange extends horizontally beyond said cover's perimeter, wherein said cover includes a threaded hole in the center thereof, wherein said irrigation pipe includes a threaded nut in the center of said pipe inside said pipe below said cover, wherein said nut is connected to a plurality of radial arms which in turn are connected to said pipe's interior, the improvement comprising:
    (a) a first vertical shaft having a short threaded portion in the upper part thereof to secure said shaft to said cover through said threaded hole;
    (b) a second vertical shaft above said first shaft;
    (c) removable coupling means at the top of said first shaft to couple said first shaft to said second vertical shaft;
    (d) a chamber at the top of said second shaft, said chamber having an opening in the bottom thereof to permit the top of said second shaft to pass therethrough, said chamber including pneumatic means therein connected to the top of said second shaft to raise and lower said second shaft, and thereby to raise and lower said first shaft through said coupling means, wherein said shafts are in the raised position when said chamber is under pneumatic pressure; wherein said chamber is defined by upper and lower compartments having a diaphragm therebetween, wherein said chamber includes first clamping means to connect said upper and lower compartments to one another at said diaphragm;
    (e) a horizontal plate connected to the bottom of said chamber, said plate having a hole through the center thereof to permit said second shaft to pass therethrough;
    (f) vertical leg means integral with the bottom of said horizontal plate and extending from the bottom of said plate to stand said plate on the top of said horizontal flange beyond the perimeter of said cover; and
    (g) second clamping means to clamp said plate to said horizontal flange.

2. The apparatus of claim 1 wherein said first vertical shaft's lower part is unthreaded and is narrow enough to slidably pass through said nut in said pipe.

3. In a cover-lifting means for lifting a horizontal cover off the top of a vertical irrigation pipe, wherein said pipe has a flange at its top on which said cover sits, wherein said flange extends horizontally beyond said cover's perimeter, wherein said cover includes a threaded hole in the center thereof, wherein said irrigation pipe includes a threaded nut in the center of said pipe inside said pipe below said cover, wherein said nut is connected to a plurality of radial arms which in turn are connected to said pipe's interior, the improvement comprising:
    (a) a first vertical shaft having a short threaded portion in the upper part thereof to secure said shaft to said cover through said threaded hole, wherein said shaft's lower part is unthreaded and is narrow enough to slidably pass through said nut in said pipe;
    (b) a second vertical shaft above said first shaft;
    (c) removable coupling means at the top of said first shaft to couple said first shaft to said second vertical shaft;
    (d) a chamber at the top of said second shaft, said chamber having an opening in the bottom thereof to permit the top of said second shaft to pass therethrough, said chamber including pneumatic means therein connected to the top of said second shaft to raise and lower said second shaft, and thereby to raise and lower said first shaft through said coupling means, wherein said shafts are in the raised position when said chamber is under pneumatic pressure;
    (e) a horizontal plate connected to the bottom of said chamber, said plate having a hole through the center thereof to permit said second shaft to pass therethrough;
    (f) vertical leg means extending from the bottom of said plate to stand said plate on the top of said horizontal flange beyond the perimeter of said cover; and
    (g) a plurality of vertical connecting rods adjustably and removably connected to the perimeter of said horizontal plate, and extending below the bottom thereof, said rods having hook means at the lower ends thereof to hook the bottom of said rods underneath said horizontal flange on said irrigation pipe.

* * * * *